(12) United States Patent
Yoneta et al.

(10) Patent No.: US 6,359,699 B1
(45) Date of Patent: Mar. 19, 2002

(54) IC CARD PROCESSING SYSTEM AND PROCESSING METHOD

(75) Inventors: Koichi Yoneta, Yokokama; Masayuki Inoue, Fujisawa; Tetsuharu Inamitsu, Chigasaki; Shigeyuki Itoh, Zushi; Yutaka Takami; Kenji Matsumoto, both of Yokohama, all of (JP)

(73) Assignees: Hitachi, Ltd., Tokyo; Hitachi Video & Information System, Inc., Kanagawa-ken, both of (JP)

( * ) Notice: Subject to any disclaimer, the term of this patent is extended or adjusted under 35 U.S.C. 154(b) by 0 days.

(21) Appl. No.: 09/098,884

(22) Filed: Jun. 17, 1998

(30) Foreign Application Priority Data

Jun. 24, 1997 (JP) ............................................. 9-167485

(51) Int. Cl.$^7$ ......................... B41B 15/00; B41J 15/00; G07B 15/00; G06F 17/60; H04L 12/66
(52) U.S. Cl. ................... 358/1.16; 358/1.15; 358/1.17; 235/38; 705/26; 705/14; 705/10; 705/41; 370/352
(58) Field of Search ............................. 705/26, 14, 10, 705/41; 235/38; 358/1.15, 1.16, 1.17; 370/352

(56) References Cited

U.S. PATENT DOCUMENTS

| 5,212,369 A | | 5/1993 | Karlisch et al. ............. 235/380 |
| 5,636,357 A | | 6/1997 | Weiner ........................ 395/442 |
| 6,070,148 A | * | 5/2000 | Mori et al. .................... 705/26 |
| 6,141,338 A | * | 10/2000 | Tadamura et al. ........... 370/352 |

FOREIGN PATENT DOCUMENTS

| JP | JP-A-5-233893 | 9/1993 |
| WO | WO 95/04328 | 2/1995 |
| WO | WO 96/38950 | 12/1996 |
| WO | WO 98/09256 | 3/1998 |

OTHER PUBLICATIONS

Briend, J. F. et al "French PTT MINITEL and LECAM programme", Philips Telecommunication Review, NL, Philips Telecommunicatie Industrie N. V. Hilversum, vol. 45, No. 2, Jun. 1, 1987, pp. 10–26.

* cited by examiner

*Primary Examiner*—Edward Coles
*Assistant Examiner*—Twyler Lamb
(74) *Attorney, Agent, or Firm*—Mattingly, Stanger & Malur, P.C.

(57) ABSTRACT

An IC card system includes an IC card, an IC card read/write unit for reading/writing the IC card, a communication unit intervening for connection to a communication line network, a controller for controlling the IC card read/write unit and communication unit, and a server system connected to the communication line network. The IC card is written with at least specified access destination information for accessing the server system, the controller automatically accesses the server system through the communication unit in accordance with the access destination information in the IC card, and the server system offers information to an information offering destination determined automatically by information to be offered which is processed by the server system, an information offering destination already written in the IC card inserted in the IC card read/write unit or an information offering destination designated by a user after the insertion of the IC card.

23 Claims, 8 Drawing Sheets

IC CARD PROCESSING SYSTEM AND PROCESSING METHOD

BACKGROUND OF THE INVENTION

The present invention relates to an IC card system using an IC card, more particularly to an IC card processing system and method which conform to the transmission and reception on communication network.

IC cards have been utilized by an electronic computer such as personal computer and work station or by a portable terminal in various fields such as recording and managing authentication of individuals and information of individuals by utilizing IC cards or carrying out payment by IC cards. In order to execute a process for read/write of data and an application program which are recorded in an IC card or a specified process by utilizing data read out of an IC card, the operational environment including the aforementioned electronic computer needs a driver application program for accessing the IC card, an interface application program necessary for a user to carry out smooth operation or an application program for performing a manager-like operation which manages these application programs. Especially, for the sake of conforming to an IC card which has been subjected to version-up with the aim of adding the function related to security of the IC card and expanding the function, the operational environment must be adjusted by partly or totally replacing the application program stored in such a host machine as the aforementioned computer or portable terminal with an up-to-date application program or by adding an up-to-date application program, and an IC card conforming to the IC card subjected to version-up must be reconstructed. Then, to acquire the up-to-date application program needed at that time, a magazine or an attached manual is confirmed and thereafter, contact is made to the offerer to receive the up-to-date application program stored in a medium including a floppy disc and work of fetching the received up-to-date application program into the operational environment is carried out.

When the work of replacement and addition of the specified application program is generated by the function addition and function expansion as described above, the system manager has to access the specified application offerer and to this end, uses the host machine such as personal computer or work station to reconstruct an intended operational environment by down-loading the specified application program from a network such as an internet to the operational environment inclusive of the host machine or by installing the specified application from a recording medium such as a floppy disc to the operational environment and performing environment setting in accordance with an instruction in a guidance or a manual displayed on a selected screen. In order to down-load or install the specified application program, it is necessary to follow such a procedure as license contract with the application offerer and payment of the rent, so that work load imposed on the system manager is increased and the operational environment setting is so complicated as to disturb widespread use of the IC card system.

SUMMARY OF THE INVENTION

The present invention contemplates elimination of the conventional drawbacks and it is an object of the present invention to improve or simplify the capability of operation for acquiring, through a communication line, information concerning IC cards and information necessary for an operational environment in which an application program, data or service is operated on a host machine such as personal computer or work station. Further, the invention intends to take advantage of easy service receiving so as to improve various kinds of function realizable by the use of IC cards and enrich card related services.

According to the present invention, to accomplish the above object, in a system having, for example, an IC card written with operation information for start and execution of an application program and service which are stored in the IC card and access destination information for an offerer which offers data, an IC card read/write unit, a host machine unit such as personal computer, work station or portable telephone set for controlling the IC card read/write unit and communication through a communication circuit network, and a server system connected to the communication network such as a public telephone line to offer various kinds of information, the host machine unit reads the access destination information stored in the IC card through the IC card read/write unit to automatically connect to the server system representing an information source connected to the communication circuit network, and the server system automatically offers the offering operation information and data to the host machine unit, IC card or an information recipient designated by a utilizer to cause it to construct an environment in which the application program and service stored in the IC card can be executed.

DESCRIPTION OF THE PREFERRED EMBODIMENTS

Preferred embodiments of the present invention will be described hereunder with reference to the accompanying drawings.

Figure 1:
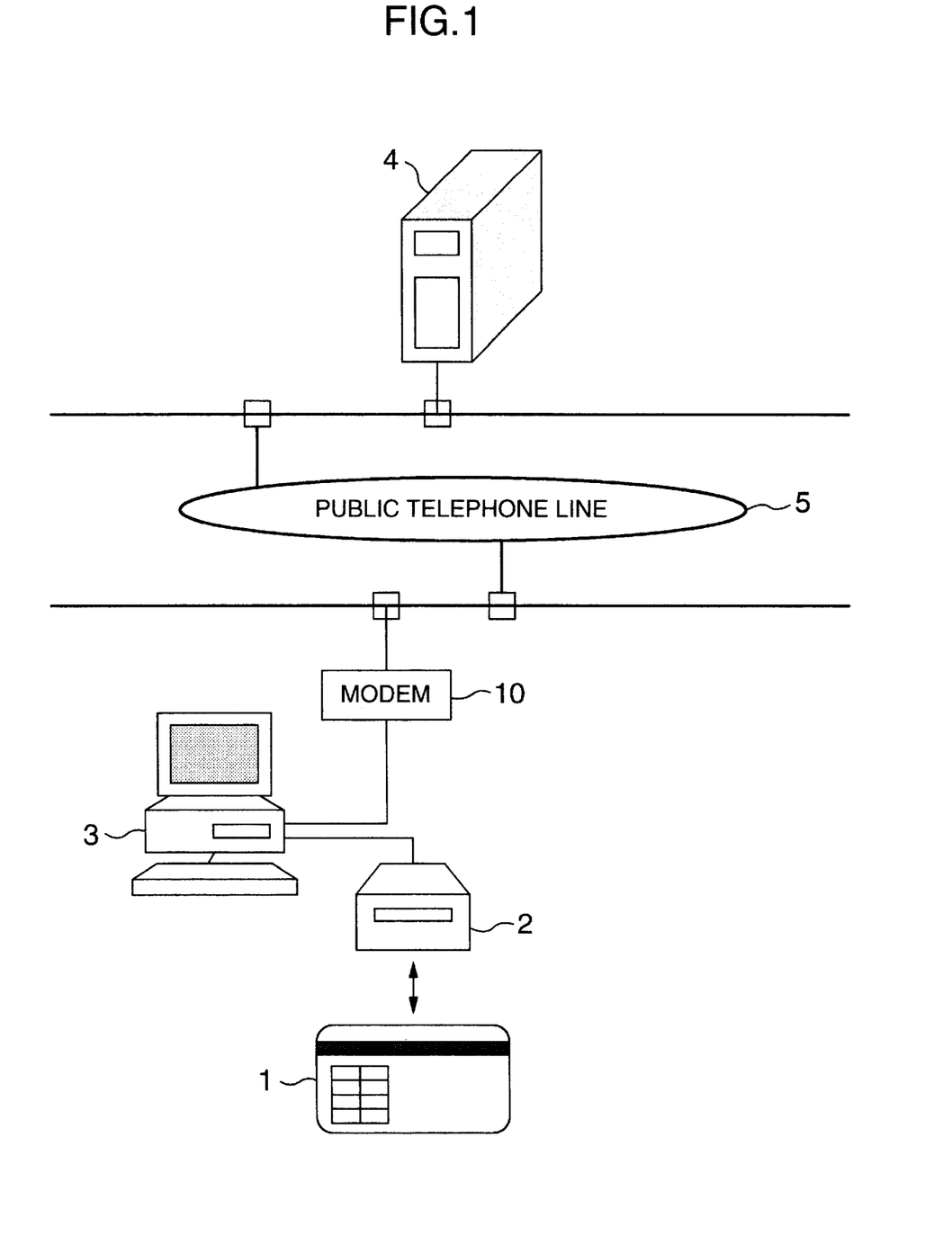
FIG. 1 is a diagram showing the construction of an IC card system according to a first embodiment of the present invention.

Referring to FIG. 1, an IC card system according to a first embodiment of the invention comprises an IC card 1 having a structure in which a program or data can be written or erased optionally, an IC card read/write unit 2 for read/write of the contents of the IC card 1, a host machine 3 comprised of, for example, a personal computer or a work station, a public telephone line 5, a modem 10 for connecting the host machine 3 to the public telephone line 5, and a server system 4 connected to the public telephone line 5.

The host machine 3 is connected with the IC card read/write unit 2 and the modem 10 and has a memory to fulfil the function of controlling the IC card read/write unit 2 and modem 10. A memory of the IC card 1 detachably mountable to the IC card read/write unit 2 is stored with at least specified access destination information for the server system 4, which specified access destination information is represented by a public telephone line number of the connection terminating server system.

Figure 2:
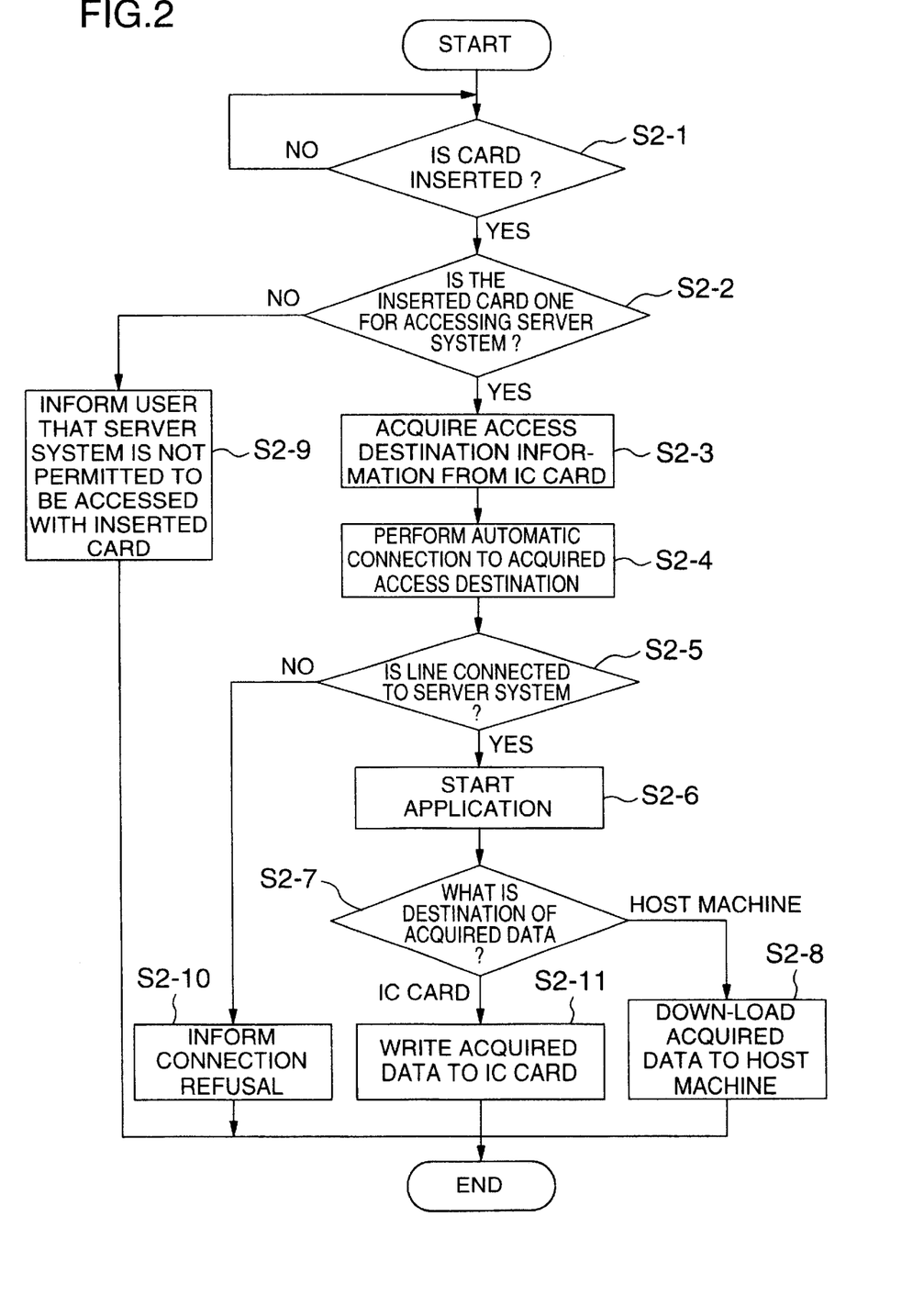
FIG. 2 is a flow chart showing the operation of the IC card system according to the first embodiment of the invention.

The operation of the above-described IC card system will be described with reference to a flow chart of FIG. 2.

When the IC card 1 is mounted to the IC card read/write unit 2 ("Yes" in step S2-1), the host machine 3 decides in accordance with information based on ATR (Answer to Rest) whether the mounted IC card 1 is a card for accessing server system 4 which is written with at least the specified access destination information for the server system 4 (step S2-2). If the mounted IC card 1 is not the card for accessing server system 4 ("No" in step S2-2), the host machine 3 informs a user that the server system 4 is not permitted to be accessed with the mounted IC card 1, by using a display unit attached to the host machine 3 (step S2-9).

On the other hand, if the mounted IC card 1 is a card for accessing server system ("Yes" in step 2-2), the host machine acquires the public telephone line number of the connection terminating server system from the memory of the IC card 1 (step S2-3) and uses the acquired public telephone line number to automatically cause the modem 10 to connect the line to the partner server system 4 (step S2-4). If this automatic connection operation succeeds in line connection to the server system 4 ("Yes" in step S2-5), the server system 4 undergoing line connection automatically starts a specified application program on the server system 4 according to the system construction in the present embodiment (step S2-6). If the line is not permitted to be connected to the server system 4 ("No" in step S2-5), an indication to this effect and an indication as to whether the operation of line connection to the server system 4 will be retried after predetermined seconds are displayed on the display unit of the host machine 3 to urge the user to decide whether the line connection operation is resumed or stopped (step S2-10).

In the present embodiment, the system is such that the contents of information to be offered and the destination to which the offered information is down-loaded are automatically determined by the aforementioned automatically started application program per se (step S2-7) and if the down-load destination is the host machine 3, the information offered from the server system 4 is down-loaded to the memory means such as hard disc or floppy disc of the host machine 3 (step S2-8) but if the down-load destination is the IC card, the information offered from the server system 4 is down-loaded to the memory of the IC card 1 via the host machine 3 (step S2-11).

In the previously described example, when the line is connected from the host machine 3 to the server system 4, the application program in the server system 4 is automatically started to immediately offer the information but alternatively, the server system 4 undergoing line connection may first transmit a guidance for offering information guide so that the guidance for information guide may be displayed on the display unit of the host machine 3 and information selected from the guidance by the user may be down-loaded to the host machine 3 or the IC card 1. In further alternative, the down-load destination of the information offered from the server system 4 may be selected and designated by the user by using an indication on the display unit of the host machine 3.

Furthermore, the specified access destination information for server system (the public telephone line number of the connection terminating sever system), a code for specifying the contents of information desired to be offered and a code indicative of a destination to which the information to be offered is down-loaded may be written to the IC card 1. In this case, the kind of the information to be offered and the down-load destination are informed to the server system 4 from the host machine 3 undergoing line connection to the server system 4 by using the public telephone line number of the connection terminating server system 4, and responsive to the information, the server system 4 transfers the desired information to the designated down-load destination.

Figure 3:
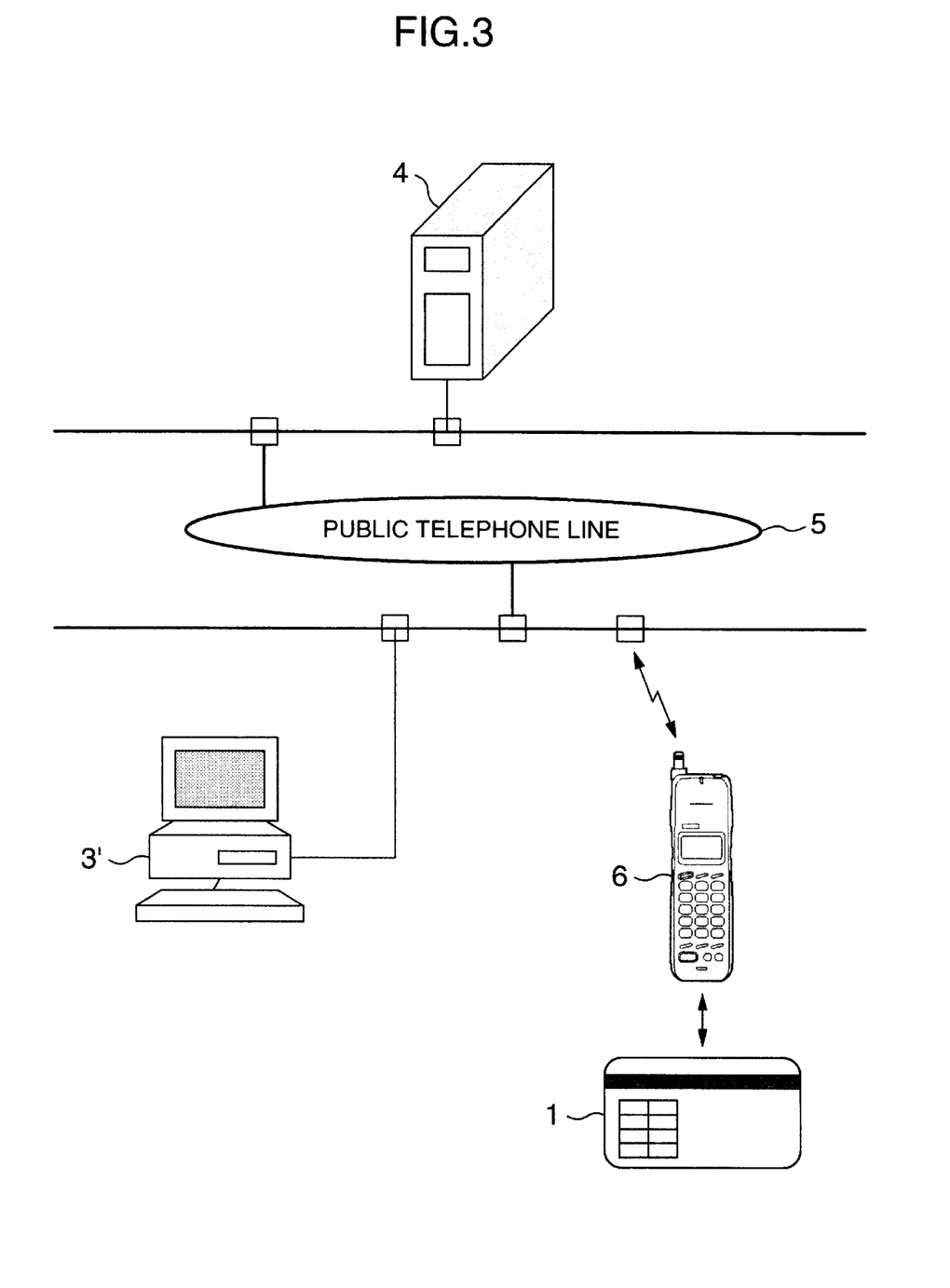
FIG. 3 is a diagram showing the construction of an IC card system according to a second embodiment of the present invention.

Referring now to FIG. 3, an IC card system according to a second embodiment of the invention will be described. In the figure, components equivalent to those in the previous embodiment will be designated by identical reference numerals and will not be described for avoidance of prolixity (this holds true for a third embodiment to be described later).

In the present embodiment, acquisition of information by the use of a portable telephone set incorporating IC card read/write means is exemplified. In FIG. 3, a portable telephone set 6 incorporates IC card read/write means and a host machine 3' representing another unit connected to a public telephone line 5 is, for example, a personal computer or a work station which is connected to the public telephone line 5 via a modem not shown. An IC card 1 in the present embodiment which is detachably mountable to the IC card read/write means of the portable telephone set 6 has the function of electronic money and is written with at least specified access destination information for a server system 4 and a public telephone line number of the host machine (another unit) 3' to which information is down-loaded, the specified access destination information being represented by a public telephone line number of the connection terminating server system.

Figure 4:
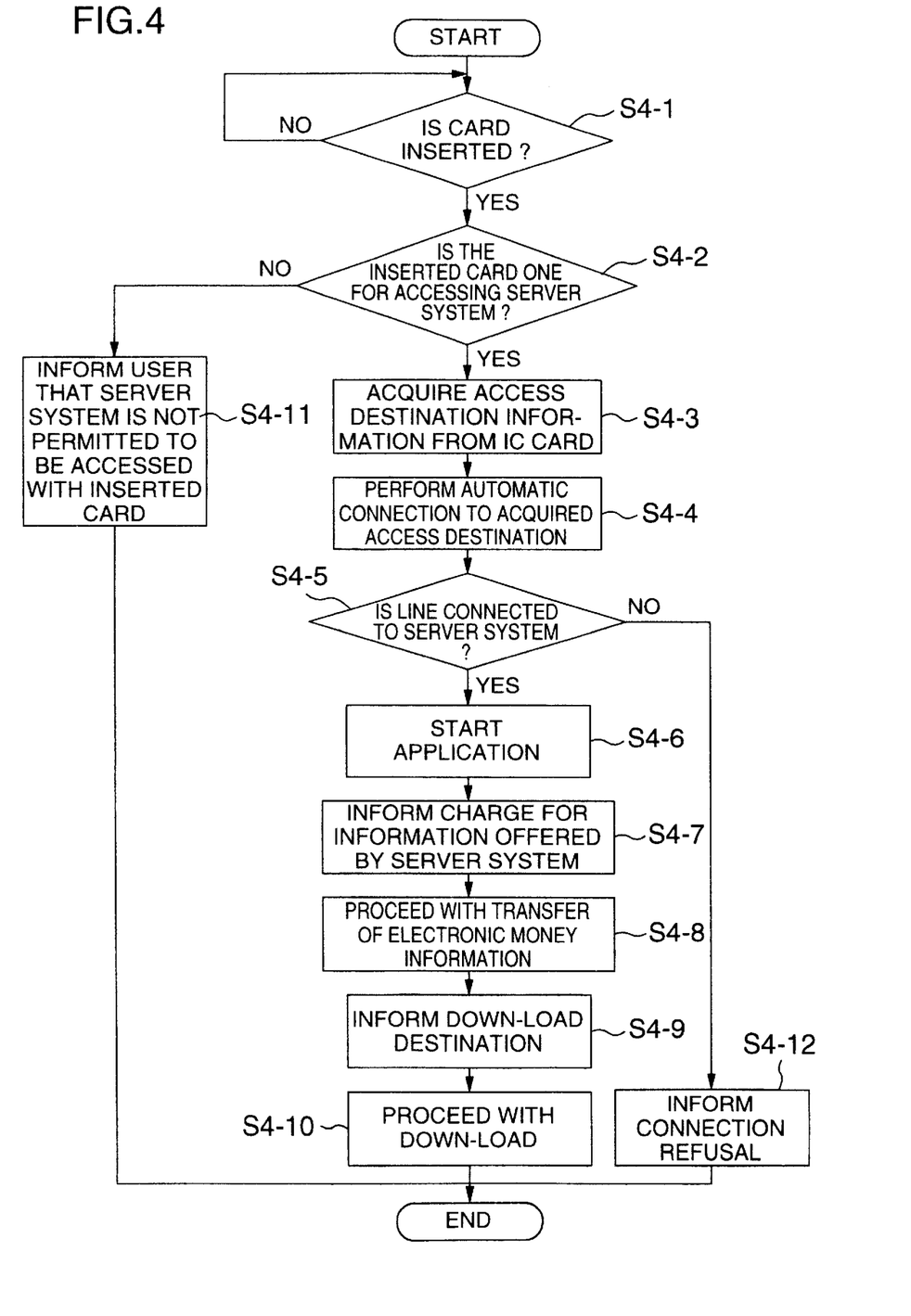
FIG. 4 is a flow chart showing the operation of the IC card system according to the second embodiment of the invention.

The operation of the IC card system of the present embodiment will be described with reference to a flow chart of FIG. 4.

When the IC card 1 is mounted to the IC card read/write means of the portable telephone set 6 ("Yes" in step S4-1), a controller of the portable telephone set 6 decides whether the mounted IC card 1 is a card for accessing server system which is written with at least specified access destination information for the server system (step S4-2). If the mounted IC card 1 is not the card for accessing the server system 4 ("No" in step S4-2), the controller of the portable telephone set 6 informs the user that the server system 4 is not permitted to be accessed with the mounted IC card 1, by using a display device provided in the portable telephone set 6 (step S4-11).

On the other hand, if the mounted IC card 1 is the card for accessing server system ("Yes" in step S4-2), the controller of the portable telephone set 6 acquires the public telephone line number of the connection terminating server system from the memory of the IC card 1 (step S4-3) and operates automatically to connect the line to the partner server system 4 by using the acquired public telephone line number (step S4-4). When this automatic connection operation succeeds in line connection to the server system 4 ("Yes" in step S4-5), the server system 4 undergoing line connection automatically starts a specified application program on the server system 4 according to the construction of the system in the present embodiment, too (step S4-6). If the line is not permitted to be connected to the server system 4 ("No" in step S4-5), an indication to this effect and an indication as to whether the line connection operation to the server system 4 is retried after predetermined seconds are displayed on the display device of the portable telephone set 6, thereby urging the user to determine whether the line connection operation is resumed or stopped (step S4-12).

The contents of information offered by the application program of server system 4 started by the aforementioned line connection is determined by this application program per se and the started application program informs the portable telephone set 6 of charge information for the offered information contents (step S4-7). Receiving this, the portable telephone set 6 transfers electronic money information by an amount of money designated by the server system 4 from the mounted IC card 1 to the server system 4 (step S4-8). After confirming receipt of the electronic money information (collection of charge), the server system 4 urges the portable telephone set 6 to inform a public telephone line number of a down-load destination described in the IC card 1 and acquires the number (step S4-9). Then, the server system 4 uses the acquired public telephone line number to connect the line to the different unit (host machine) 3' which is the down-load destination and down-loads the aforementioned predetermined information contents to the host machine 3'. The down-load destination may be either the IC card 1 or the host machine 3; or alternatively, after the IC card 1 is inserted into the IC card read/write means of the portable telephone set 6, the down-load destination may be designated.

As described above, according to the present embodiment, if carrying about the portable telephone set 6 incorporating the IC card read/write means, the user can down-load predetermined information to a designated unit wherever the user is.

In the aforementioned example, the application program of the server system 4 is automatically started when line connection from the portable telephone set 6 to the server system 4 is set up and the information is offered to the different unit (host machine) 3' which is the down-load destination as soon as collection of charge based on electronic money is confirmed. But alternatively, the server system 4 undergoing line connection may first transmit a guidance for offering information guide to the portable telephone set 6 to cause the display device of the portable telephone set 6 to display the guidance for information guide and after collection of charge based on electronic money for information selected from the guidance by the user is confirmed, the information may be down-loaded to the designated different unit (host machine) 3'. Further, a code for specifying the contents of information to be offered may be written to the IC card 1.

Figure 5:
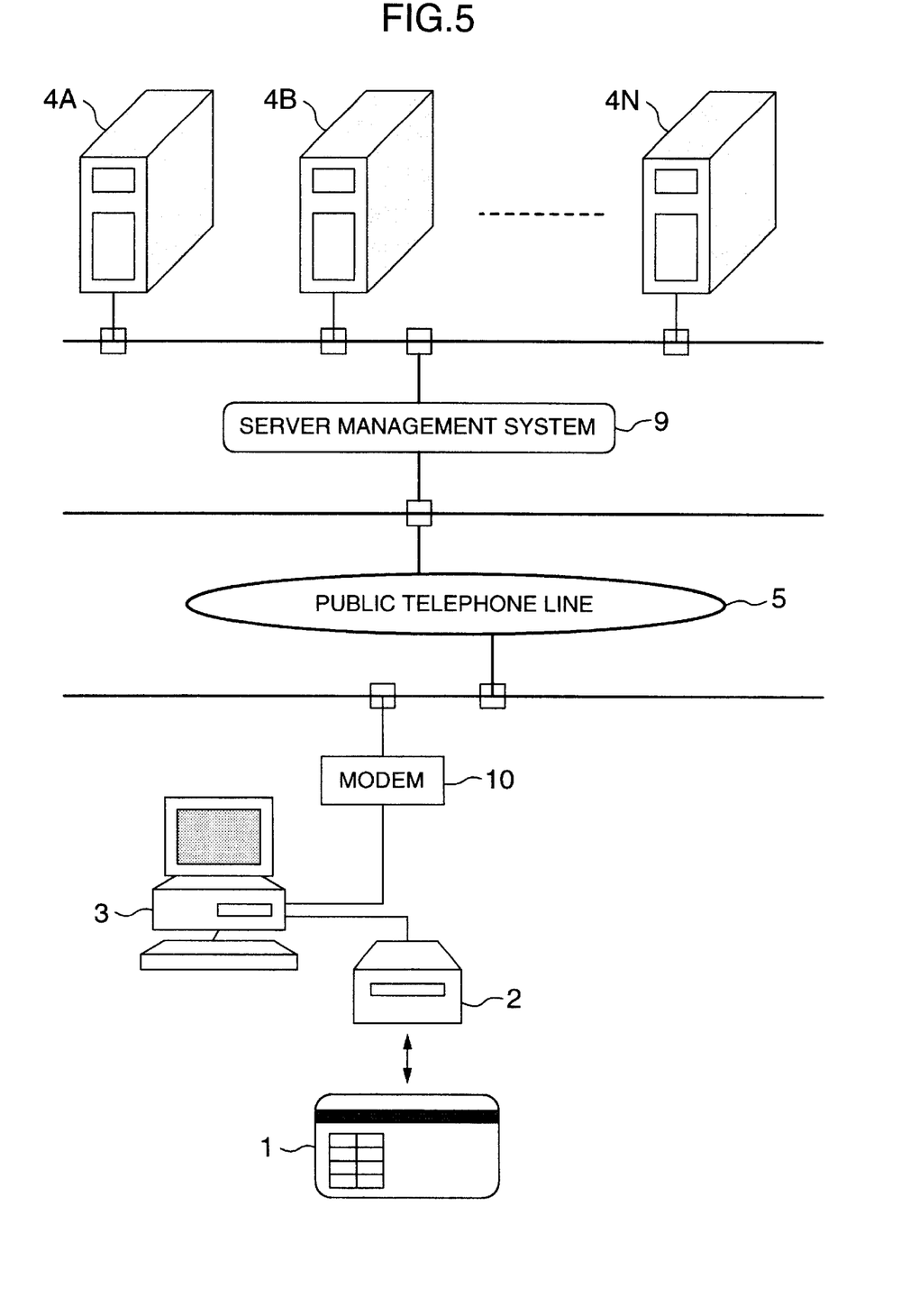
FIG. 5 is a diagram showing the construction of an IC card system according to a third embodiment of the present invention.

Referring to FIG. 5, an IC card system according to a third embodiment of the present invention comprises a server management system 9 connected to a public telephone line 5 and a plurality of server systems 4A, 4B, . . . , 4N which offer various kinds of services and application programs. Each of the server systems 4A, 4B, . . . , 4N is connected to the server management system 9 through a dedicated network so that the server management system 9 may collectively manage the respective server systems 4A, 4B, . . . , 4N. An IC card 1 detachably mountable to an IC card read/write unit 2 has the function of electronic money and is written with at least specified access destination information for the server management system 9, which specified access destination information is represented by a public telephone line number of the connection terminating server management system. The server management system 9 manages the IC card 1 independently of a host machine 3 to deal with a problem raised between each server system and the IC card.

Figure 6:
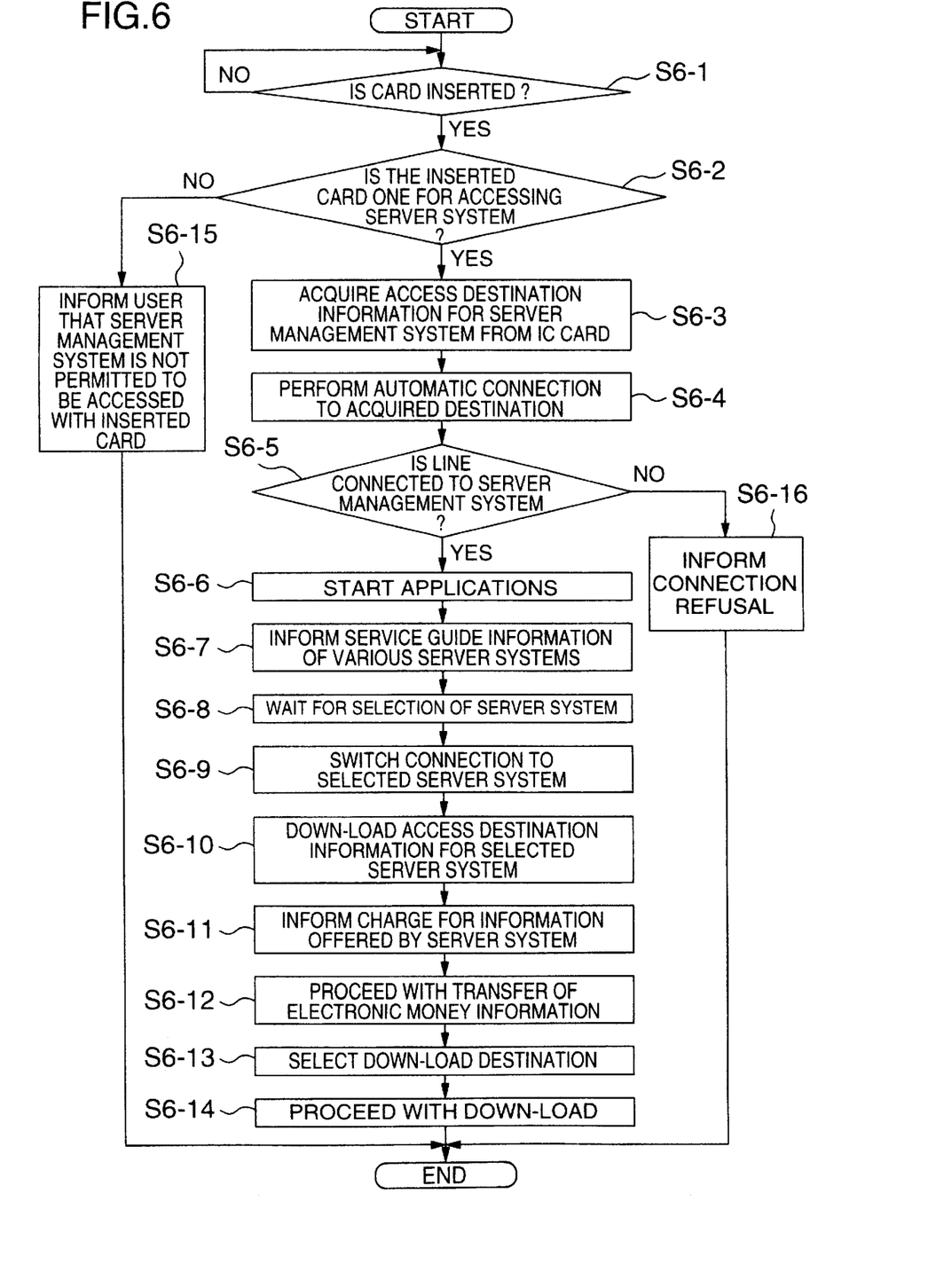
FIG. 6 is a flow chart showing the operation of the IC card system according the third embodiment of the invention.

The operation of the IC card system of the present embodiment will be described with reference to a flow chart of FIG. 6.

When the IC card 1 is mounted to the IC card read/write unit 2 ("Yes" in step S6-1), the host machine 3 decides whether the mounted IC card is a card for accessing server management system which is written with at least specified destination information for the server management system (step S6-2). If the mounted IC card 1 is not the card for accessing server management system ("No" in step S6-2), the host machine 3 informs a user that the server management system is not permitted to be accessed with the mounted IC card 1, by using the display unit attached to the host machine 3 (step S6-15).

On the other hand, if the mounted IC card 1 is the card for accessing server management system ("Yes" in step S6-2), the host machine 3 acquires a public telephone line number of the connection terminating server management system from the memory of the IC card (step S6-3) and operates automatically to connect the line to the partner server management system 9 by using the acquired public telephone line number (step S6-4). If this automatic connection operation succeeds in the line connection to the server management system 9 ("Yes" in step S6-5), the server management system 9 undergoing line connection automatically starts specified application programs on the server systems 4A, 4B, . . . , 4N (step S6-6) according to the construction of the system. If the line is not permitted to be connected to the server management system 9 ("No" in step S6-5), an indication to this effect and an indication as to whether the line connection operation to the server management system 9 is retried after predetermined seconds are displayed on the display unit of the host machine 3 to urge the user to determine whether the line connection operation is resumed or stopped (step S6-16).

The contents offered by the application program of server management system 9 started by the aforementioned line connection is determined by this application program per se and the started application program informs the host machine 3 of guide information of offered information contents indicative of the contents of application program and service offered by each of the server systems 4A, 4B, . . . , 4N under the command of the server management system 9 as well as charge information for individual offered information pieces (step S6-7). Receiving this information, the host machine 3 displays the guide information of the offered information contents and the charge information for the individual offered information pieces on the display unit of the host machine 3 to urge the user to select a server system representing an access object desired by the user (step S6-8).

Thus, when the user selects a desired server system (selects desired offering information), an indication to this effect is informed from the host machine 3 to the server management system 9, and responsive to this information, the server management system 9 switches the connection to the selected server system (step S6-9). At that time, the server management system 9 down-loads access destination information for the selected server system to the IC card 1 (step S6-10). In steps following the step S6-10, access to this server system selected by the IC card 1 can be permitted directly without being done by the route of the server management system 9.

With the access to the selected server system started, an application program inherent to this server system is started and the started application program of the server system informs the host machine 3 of charge information for offered information contents (step S6-11). Receiving this information, the host machine 3 transfers electronic money information from the mounted IC card 1 to the server system by an amount of money designated by the server system (step S6-12). At that time, after confirming the information rent displayed on the display unit of the host machine 3, the user may transfer the electronic money information by depressing a confirmation button.

After confirming the collection of charge based on the aforementioned electronic money information, the server system informs the host machine 3 of guidance information for designating a destination to which the offered information is down-loaded and responsive to this information, the host machine 3 displays the aforementioned guidance information on the display unit. When the user selects a desired down-load destination through the display (step S6-13), an indication to this effect is informed from the host machine 3 to the server system. Receiving this information, the server system down-loads offered information to the designated down-load destination (step S6-14). In the present embodiment, the hard disc, floppy disc or RAM of the host machine 3 or the memory of the IC card 1 is selected as the down-load destination.

Thus, according to the present embodiment, operation for selection of an origin from which information is acquired can be facilitated by utilizing the server management system which manages the plurality of server systems.

While in the above example the down-load destination desired by the user is selected by causing the server system to inform the guidance information for designating the down-load destination, the down-load destination of the offered information may be determined automatically by the application program per se which is started automatically in the server system as in the foregoing first embodiment. Alternatively, a code for specifying the contents of information to be offered (specifying a server system desired to be accessed) and/or a code for specifying a destination to which information is down-loaded may be written in the IC card 1.

Figure 7:
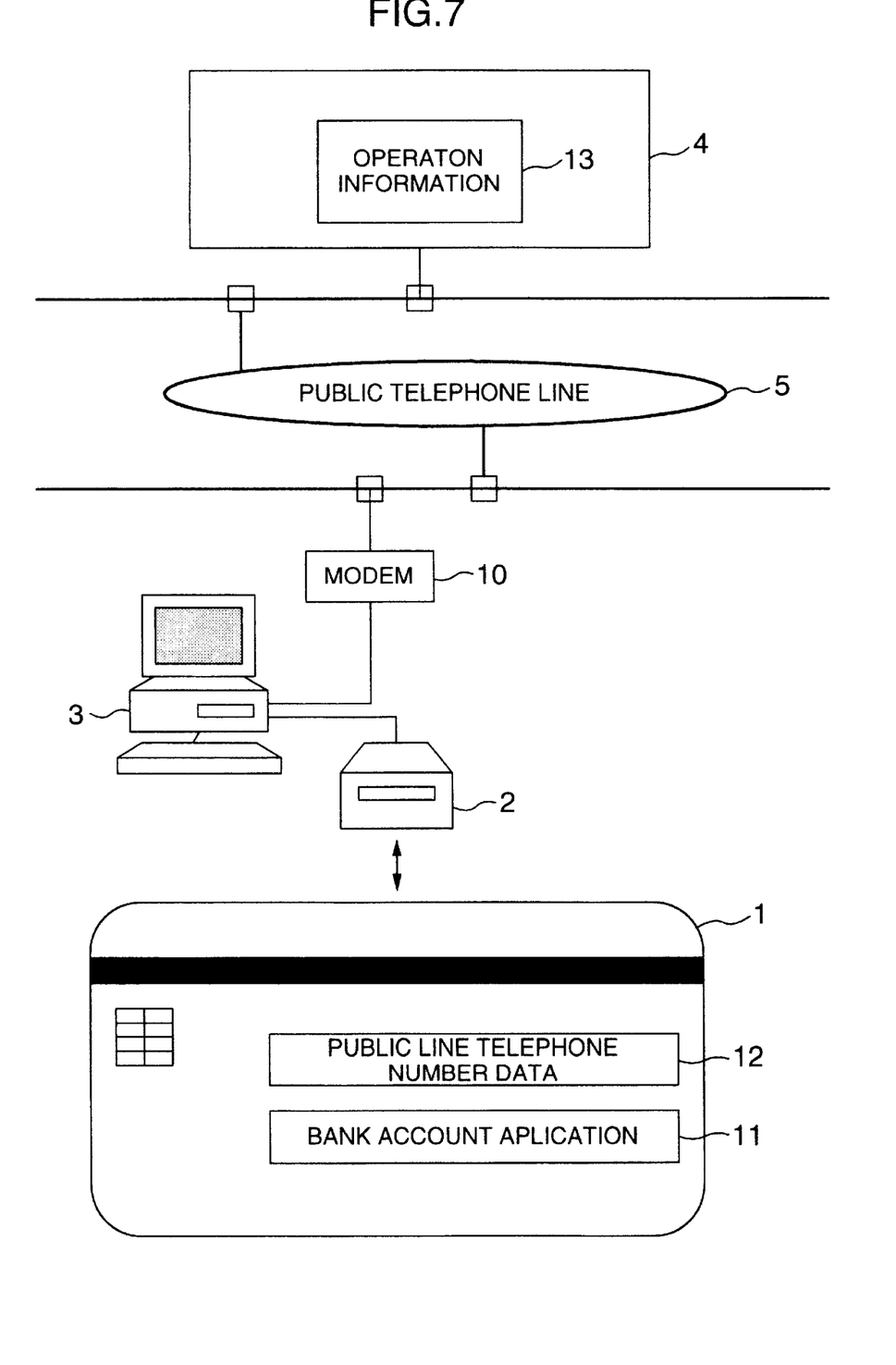
FIG. 7 is a diagram showing the construction of an IC card system according to a fourth embodiment of the invention.

Referring now to FIG. 7, an IC card system according to a fourth embodiment of the invention will be described. Essentially, the system construction of the present embodiment resembles that of the first embodiment. In the IC card system of the present embodiment, a host machine 3 is connected with an IC card read/write unit 2 and a modem 10 and has the function of controlling the IC card read/write unit 2 and modem 10 and deciding data fetched from the IC card 1 by means of the IC card read/write unit 2. The IC card 1 mounted/dismounted to or from the IC card read/write unit 2 is stored with at least a bank account application 11 for controlling data such as receipt/payment of money in a bank account of an owner of the IC card 1 and public line telephone number data 12 representing specified access destination information for a server system 4 of a company which offers operation information adapted to start the bank account application 11. The server system 4, on the other hand, is stored with operation information 13 for execution of the bank account application program 11.

Figure 8:
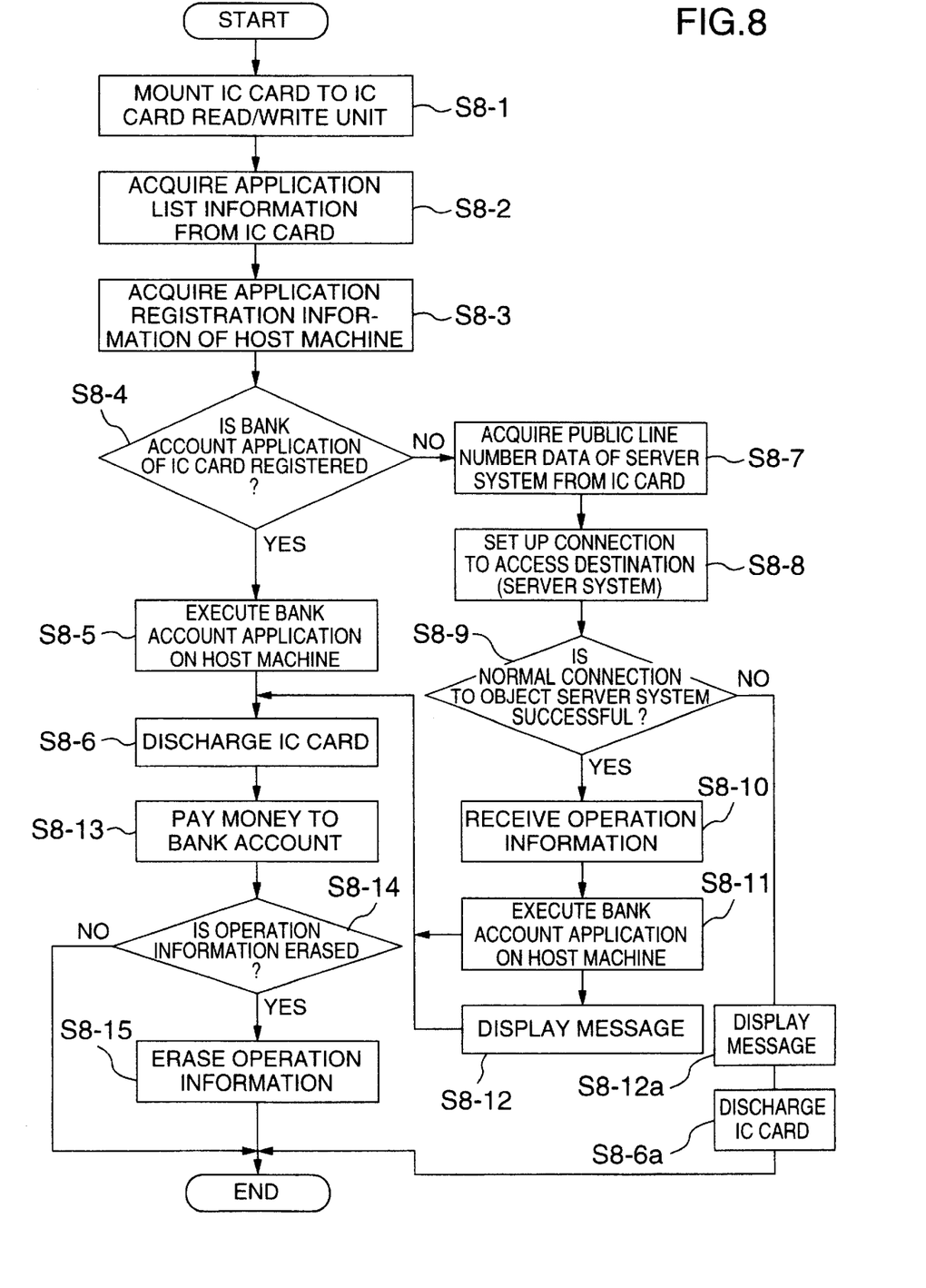
FIG. 8 is a flow chart showing the operation of the IC card system according to the fourth embodiment of the invention.

The operation of the IC card system of the present embodiment will be described with reference to a flow chart of FIG. 8.

When the IC card 1 is mounted to the IC card read/write unit 2 (step S8-1), the host machine 3 acquires application program list information stored in the mounted IC card 1 from the IC card 1 (step S8-2). Next, the host machine 3 acquires application program registration information indicating application programs executable on the host machine (step S8-3). Then, the host machine 3 compares the application program list information with the application program registration information to decide whether the application program stored in the IC card 1 is executable on the host machine 3 (step S8-4). Here, description will continue on the assumption that the object application program is the bank account application program 11.

When the result of decision indicates that the bank account application program 11 is registered ("Yes" in step S8-4), the bank account application program 11 is executed on the host machine 3 (step S8-5). For example, when balance confirmation, confirmation of record of receipt/payment of money and record data in connection with a bank account of an owner of the IC card 1 are printed out to end the processing, the host machine 3 controls the IC card read/write unit 2 so as to discharge the IC card 1 (step S8-6). Subsequently, money is paid to the bank account (step S8-13) and then the operation information used for execution of the application program is subjected to erasure (step S8-14). If the operation information should be erased, the operation information is erased (step S8-15) to end the processing. On the other hand, when the absence of operation information is determined in the step S8-14, the program proceeds to end. For example, at that time, the host machine 3 confirms, from the application program registration information, version information of the operation information for execution of the bank account application program 11 on the host machine 3, controls the IC card read/write unit 2 to read public line number data (access information for the server system) stored in the IC card 1, connects to the server system 4 via a public telephone line 5 by controlling the modem 10, and receives up-to-date version information of the operation information for execution of the bank account application program 11 to compare the up-to-date version information with the version information of the operation information on the host machine 3. If the latter version information is older than the former version information received from the server system 4, the host machine 3 may receive the up-to-date operation information from the server system 4. Further, upon reception of the operation information, the band account application program may automatically be registered in the application program registration information or the host machine manager or the owner may be urged to select registration or non-registration so as to perform selective registration. The operation information is information for specifying the application program.

On the other hand, when the bank account application program 11 is not registered in the application program registration information ("No" in step S8-4), the host machine 3 controls the IC card read/write unit 2 so as to read public line number data (access destination information for server system) stored in the IC card 1 (step S8-7) and automatically operates to connect the line to the server system 4 via the public telephone line 5 by controlling the modem 10 (step S8-8). If the normal connection to the server system 4 is not permitted ("No" in step S8-9), a message to the effect that the connection to the server system 4 is refused is displayed (step S8-12a) and the host machine 3 controls the IC card read/write unit 2 so as to discharge the IC card 1 (step S8-6a). If the normal connection to the server system 4 is permitted ("Yes" in step S8-9), the host machine 3 receives operation information for execution of the bank account application program 11 from the server system 4

(step S8-10). The host machine 3 thus receiving the operation information brings the bank account application program 11 into a state in which the bank account application program 11 is executable by being added with the function to execute the bank account application program 11. Under this state, the bank account application program 11 is executed on the host machine 3 (step S8-11). A message to the effect that the connection to the server system 4 is accepted is displayed (S8-12). When the processing ends, the host machine 3 controls the IC card read/write unit 2 so as to discharge the IC card 1 (step S8-6). At that time, in order to make full use of the storage medium resource, the operation information received by the host machine 3 may automatically be erased or a message as to whether the information is erased may be displayed to permit the host machine manager or the owner to selectively erase the operation information.

As described above, according to the present embodiment, the information necessary for constructing an operational environment when a suitable application (or service) such as the bank account application program 11 of IC card 1 is operated on the host machine 3 can be acquired easily and steadily from the server system 4 via the communication line, thereby bringing about advantages that the capability of operation for the above information acquisition can be improved and the operation can be simplified.

In the present invention, the contents of information offered from the server system 4 (or server management system 9) to the host machine 3 for controlling the IC card read/write unit 2, the host machine 3' representing a different unit which is designated as an information offering destination or the IC card may be of any kinds including various kinds of service such as tour guide, weather forecast, sports information or electronic shop guide or various kinds of application software such as business application program or amusement application program. In addition to the above, the following may be considered as information offered from the server system 4.

For example, when the host machine 3 or 3' or the IC card 1 is written with a predetermined application program on the market, key information for permitting operation of the predetermined application program and version-up information of the predetermined application program such as function addition information or function change information may be enumerated. Further, when the host machine 3 or 3' or the IC card 1 is written with a predetermined application program on the market and the written predetermined application program is partly lacks, supplementary information which replenishes the partly lacking predetermined application program to place it in completely operative condition may be considered.

Further, when the IC card 1, which initially has only access management information for the aforementioned server system 4, is desired to function as an IC card dedicated to a special use (for example, IC card serving as electronic money available only for shops in a certain area), function addition information may be considered as the information offered from the server system 4. In this case, if the above specified utilization is selected from a plurality of choices by interactively using the display unit, general purpose natures of the special utilization applied to the IC card 1 can be promoted.

While, in the foregoing embodiments, the information communication has been described as using the public telephone line, information communication using a dedicated network may be within the framework of the present invention.

What is claimed is:

1. An IC card system, comprising:
   an IC card;
   an IC card read/write unit for reading and writing said IC card;
   a communication unit for connecting said IC card read/write to a communication line network;
   a controller for controlling said IC card read/write unit and the communication unit; and
   a plurality of server systems connected to said communication line network; and
   a server management system connected to said communication line network, for integrally managing said plurality of server systems, wherein
   said IC card stores at least access destination information for a specific server system among said plurality of server systems;
   said plurality of server systems each stores application program and/or operation-environment information for use in said IC card and said controller;
   said controller accesses automatically to the destination access information;
   said server management system posts application information individually provided by said plurality of server systems to said controller:
   said server management system switches a connection to said plurality of server systems in response to selection information indicative of an application program from said controller; and
   one of said server systems down-loads at least one of the application program and the operation-environment information to a down-load destination determined automatically by at least one the application program and the operation-environment information or by directed by a user.

2. An IC card system according to claim 1, wherein said IC card stores down-load destination information at least one of the application program and the operation environment information, thereby down-loading the application program and/or the operation-environment information in response to the down-load destination information.

3. An IC card system according to claim 1, wherein when receiving all pieces of information in a predetermined application program by accessing said server system or said server management system, said IC card brings said received predetermined application program into a utilizable state.

4. An IC card system according to claim 1, wherein said controller deletes automatically or selectively the operation information stored in said storage unit after terminating of executing the application program of said IC card.

5. An IC card system according to claim 1, wherein said IC card stores electronic money information, thereby performing a change processing of the electronic money information, when down-loading the operation-environment information from said server system.

6. An IC card system, comprising:
   an IC card storing an application program;
   an IC card read/write unit for reading/writing information stored in said IC card;
   a communication unit for connecting said IC card read/write unit to a communication line network;
   a controller having a memory unit and also having a function for controlling said IC card read/write unit and said communication unit and a function for evaluating data read by said IC card read/write unit from said IC card; and a server system enabling to communicate with said communication unit through the communication line network and for storing operation information indicative of executing the application program stored in said IC card controller, wherein said IC card stores at least one access destination information for access to the server system storing the operation information corresponding to the application program stored in said IC card;

said controller controls said IC card read/write unit to acquire at least one access destination information from said IC card, when the operation information corresponding to the application program stored in said IC card is absent in said memory unit, controls said communication unit to said access at least one of said server systems in response to the access destination information acquired, stores the operation information from said server system in said memory unit, and enables to execute said application program.

7. An IC card system according to claim 6, wherein controller deletes automatically and selectively the operation information stored in said storage unit after terminating of executing the application program of said IC card.

8. An information transmitting method of an IC card system using with an IC card storing an application program; an IC card read/write unit for reading/writing information stored in the IC card read/write unit; a communication unit for connecting the IC card read/write unit to a communications network; a controller having a memory unit and also having a function for controlling the IC card read/write unit and the communication unit and a function for evaluating data read by the IC card read/write unit from the IC card; and a server system enabling to communicate with the communication unit through the communication line network, said method comprising the steps of (a) previously storing operation information corresponding to the application program in the server system;

(b) previously storing at least one access destination information in the IC card. for accessing to the server system storing the operation information;

(c) acquiring at least one access destination information from the IC card by controlling the IC card read/write unit when the controller decides that the operation information corresponding to the application program read from the IC card by the IC card read/write unit is absent in the memory unit;

(d) accessing to at least one server system in response to the acquired access destination information with the controller controlled the communication unit;

(e) storing the operation information in the memory by transmitting the operation information by the controller; and (g) executing the application program in the controller.

9. An IC card using with an IC card read/write unit for reading/writing information stored in said IC card; a communication unit for connecting said IC card read/write unit to a communication line network; a controller having a memory unit and also having a function for controlling said IC card read/write unit and said communication unit and a function for evaluating data read by said IC card read/write unit from said IC card; and a server system enabling to communicate with said communication unit through the communication line network and for storing operation information indicative of executing the application program stored in said IC card in said controller comprising:

an application program memory unit for storing an application program; and an access destination information memory unit for storing at least one access destination information for access to the server system storing the operation information indicative of the application program to be executed in said controller.

10. An IC card system according to claim 8, wherein when receiving all pieces of information in a predetermined application program by accessing said server system, said IC card brings said received predetermined application program into a utilizable state.

11. A controller according to claim 10, wherein said controller deletes automatically and selectively the operation information stored in said memory unit after terminating of executing the application program of said IC card.

12. An information transmitting method according to claim 11, wherein when receiving all pieces of information in a predetermined application program by accessing said server system, said IC card brings said received predetermined application program into a utilizable state.

13. An information transmitting method of a controller related to an IC card system using with an IC card storing an application program and at least one access destination information for access to a server system storing operation information corresponding to the application program; an IC card read/write unit for reading/writing information stored in the IC card; a communication unit for connecting the IC card read/write to a communication line network; a controller having a memory unit and also having a function for controlling the IC card read/write unit and the communication unit and a function for evaluating data read by the IC card read/write unit; and a server system enabling to communication with the communication unit through the communication line network and for storing operation information corresponding to the application program, said method comprising the steps of:

(a) acquiring at least one access destination information from the IC card by controlling the IC card read/write unit, when the operation information corresponding to the application program of the IC card read by the IC card read/write unit is absent in the memory unit;

(b) accessing to at least one server system in response to the acquired access destination information by controlling the communication unit;

(c) storing the operation information in the memory unit by transmitting the operation information from the server system; and (d) executing the application program.

14. An IC card according to claim 13, wherein when receiving all pieces of information in a predetermined application program by accessing said server system, said IC card brings said received predetermined application program into a utilizable state.

15. A controller using with an IC card storing an application program and at least one access destination information for access to a server system storing operation information corresponding to the application program; an IC card read/write unit for reading/writing information stored in said IC card; a communication unit for connecting said IC card read/write unit to a communication like network; and a server system enabling to communicate with said communication unit through said communication like network and storing operation information indicative of executing the application program stored in said IC card, comprising:

a memory unit; and an evaluation unit evaluating data read from said IC card by said IC card read/write unit, wherein at least one access destination information is acquired from said IC card by controlling said IC card read/write unit, when said evaluation unit evaluates that the operation information corresponding to the application program stored in said IC card is absent in said memory unit;

said communication unit is controlled by said controller, an access being performed to at least one server system in response to the access destination information acquired;

the operation information from said server system is stored in said memory unit; and the application program is executed.

16. A controller according to claim 15, wherein when receiving all pieces of information in a predetermined application program by accessing said server system, said IC card brings said received predetermined application program into a utilizable state.

17. A controller according to claim 15, wherein said controller deletes automatically and selectively the operation information stored in said memory unit after terminating of executing the application program of said IC card.

18. A server system using with an IC card storing an application program and at least one access destination information for access to a server system storing operation information corresponding to the application program; an IC card read/write unit for reading/writing information stored in said IC card; a communication unit for connecting said IC card read/write unit to a communication line network; and a controller having a memory unit and also having a function for controlling said IC card read/write unit and said communication unit and a function for evaluating data read by said IC card read/write unit, comprising:

an operation information memory unit for storing operation information to execute the application program stored in said IC card in said controller, wherein said server system enables to communicate with said communication unit through said communication line network, and transmits the operation information corresponding to the application program store in said operation information memory unit to said controller to execute the application program to said controller, when the operation information corresponding to the application program read from said IC card by said IC card read/write unit is absent in said memory unit, and when said server system is accessed by controlling said communication unit in response to access destination information stored in said IC card.

19. An information transmitting method of a controller related to an IC card system using with an IC card storing an application program and at least one access destination information for access to a server system storing operation information corresponding to the application program; an IC card read/write unit for reading/writing information stored in the IC card; a communication unit for connecting the IC card read/write to a communication line network; a controller having a memory unit and also having a function for controlling the IC card read/write unit and the communication unit and a function for evaluating data read by the IC card read/write unit; and a server system enabling to communicate with the communication unit through the communication line network and for storing operation information corresponding to the application program, said method comprising the steps of:

(a) acquiring at least one access destination information from the IC card by controlling the IC card read/write unit, when the operation information corresponding to the application program of the IC card read by the IC card read/write unit is absent in the memory unit;

(b) accessing to at least one server system in response to the acquired access destination information by controlling the communication unit;

(c) storing the operation information in the memory unit by transmitting the operation information from the server system; and (d) executing the application program.

20. An information transmitting method according to claim 19, wherein when receiving all pieces of information in a predetermined application program by accessing said server system, said IC card brings said received predetermined application program into a utilizable state.

21. An information transmitting method according to claim 19, wherein when receiving all pieces of information in a predetermined application program by accessing said server system, said IC card brings said received predetermined application program into a utilizable state.

22. An information transmitting method of a server system related to an IC card system using with an IC card storing an application program; an IC card read/write unit for reading/writing information stored in the IC card; a communication unit for connecting the IC card read/write unit to a communication line network; a controller having a memory unit and also having a function for controlling the IC card read/write unit and the communication unit and a function for evaluating data read by the IC card read/write unit from the IC card; and a servery system enabling to communicate with the communication unit through the communication line network, said method comprising the steps of:

(a) previously storing operation information corresponding to the application program; and (b) transmitting the operation information to the controller to execute the application program in the controller, when the server system is accessed fromt he controller in response to at least one access destination information corresponding to the application program previously stored in the IC card.

23. An information transmitting method according to claim 22, wherein when receiving all pieces of information in a predetermined application program by accessing said server system, said IC card brings said received predetermined application program into a utilizable state.

* * * * *